United States Patent [19]

Stoltman

[11] Patent Number: 4,693,275

[45] Date of Patent: Sep. 15, 1987

[54] ELECTRO-HYDRAULIC PRESSURE REGULATING VALVE

[75] Inventor: Donald D. Stoltman, Henrietta, N.Y.

[73] Assignee: General Motors Corporation, Detroit, Mich.

[21] Appl. No.: 936,636

[22] Filed: Nov. 28, 1986

[51] Int. Cl.[4] ............................................. F15B 13/044
[52] U.S. Cl. ............................. 137/625.65; 251/129.16
[58] Field of Search ................ 137/625.65; 251/129.16

[56] References Cited

U.S. PATENT DOCUMENTS

| | | | |
|---|---|---|---|
| 2,914,034 | 11/1959 | Becker | 137/625.65 |
| 3,498,330 | 3/1970 | Paige . | |
| 3,726,315 | 4/1973 | Sheppard | 137/625.65 |
| 3,960,361 | 6/1976 | York | 137/625.65 X |
| 4,005,733 | 2/1977 | Riddel | 137/625.65 |
| 4,076,045 | 2/1978 | Nakajima et al. | 137/625.65 |
| 4,196,751 | 4/1980 | Fischer et al. | 251/129.16 X |
| 4,310,023 | 1/1982 | Kah | 251/129.16 X |
| 4,354,640 | 10/1982 | Hans . | |
| 4,534,381 | 8/1985 | Hozumi et al. . | |
| 4,572,436 | 2/1986 | Stettner et al. | 251/129.16 X |
| 4,588,162 | 5/1986 | Moffat | 137/625.65 X |
| 4,598,736 | 7/1986 | Chorkey | 137/625.65 |

Primary Examiner—Gerald A. Michalsky
Attorney, Agent, or Firm—Saul Schwartz

[57] ABSTRACT

An electro-hydraulic pressure regulating valve including a control pressure chamber, an annular supply pressure port connected to the control pressure chamber and having a first seat area, an annular exhaust port connected to the control pressure chamber and having a second seat area equal to the first seat area, an armature valve plate spring biased to a supply seated position closing the supply pressure port with the exhaust port open, and an electric solenoid operative when selectively energized to create a solenoid EMF for moving the armature plate to an exhaust seated position closing the exhaust port with the supply pressure port open. The armature plate has a circular cut-out therein aligned with the centers of the annular supply pressure and exhaust ports and the differential pressure area of the armature plate in the supply seated and the exhausted seated positions is equal to substantially only the first and second seat areas.

2 Claims, 3 Drawing Figures

ELECTRO-HYDRAULIC PRESSURE REGULATING VALVE

RELATED PATENTS AND APPLICATIONS

The subject matter of this patent application is related to the subject matter of U.S. Pat. No. 4,572,436, issued Feb. 25, 1986 to Ernest R. Stettner, Kenneth P. Cianfichi and Donald D. Stoltman and assigned to the assignee of this application, and to the subject matter of U.S. patent application Ser. No. 859,014, filed by Ernest R. Stettner and Donald D. Stoltman on May 2, 1986 and assigned to the assignee of this application.

BACKGROUND OF THE INVENTION

1. Field of the Invention

This invention relates to electro-hydraulic pressure regulating valves.

2. Description of the Prior Art

Electro-hydraulic pressure regulating valves typically include a supply pressure port, a control pressure port, and an exhaust port. An electric solenoid moves a valve member or armature plate between seated positions on the supply pressure and exhaust ports to expose the control pressure port alternately to a supply pressure and to an exhaust whereby a control pressure is regulated at the control pressure port. Fluid flow through and the pressure capacity of the valve depend, at least in part, on the lift of the valve member relative to the supply pressure port and the exhaust port and the solenoid electro-magnetic force (EMF) of the valve. An electro-hydraulic pressure regulating valve according to this invention incorporates a novel combination of structural elements which contribute to optimizing the pressure and flow capacity of the valve while minimizing the required solenoid EMF.

SUMMARY OF THE INVENTION

This invention is a new and improved electro-hydraulic pressure regulating valve for regulating a control pressure at a control pressure port of the valve by alternately connecting the control pressure port to supply pressure at a supply pressure port and to exhaust at an exhaust port of the valve, the valve being of the general type having a valve member spring biased to a seated position on the supply pressure port with the exhaust port open and being moveable by an electric solenoid to a seated position on the exhaust port with the supply pressure port open. In the pressure regulating valve according to this invention, the supply pressure port and the exhaust port are annuli and the valve member, in both of its seated positions, has a differential pressure area equal to substantially only the seat areas of the supply pressure and exhaust ports. In the pressure regulating valve according to this invention, the annular shape of the supply pressure and exhaust ports permits coordination between the outer circumferences of the ports and the valve lift so that maximum fluid flow is achieved at minimum lift while the elimination of differential fluid pressure on the valve member in the centers of the ports minimizes the differential pressure resultant forces on the valve member which must be overcome by the solenoid EMF and the return spring. In a preferred embodiment of the pressure regulating valve according to this invention, the valve member is a flat armature plate disposed in the control pressure chamber of the valve between the supply pressure port and the exhaust port and pivotable between alternate seated positions on the ports, the armature plate having a hole or void therein which is aligned with the center of each of the supply pressure and the exhaust ports in the seated positions of the plate thereby to confine the differential pressure area of the plate to substantially only the seat areas of the ports. In the preferred embodiment, the annular exhaust port is formed in a distal end of a stem portion of the inner magnetic pole piece of the solenoid to achieve compactness and simplicity.

DESCRIPTION OF THE PREFERRED EMBODIMENT

Figures 1, 2, 3:
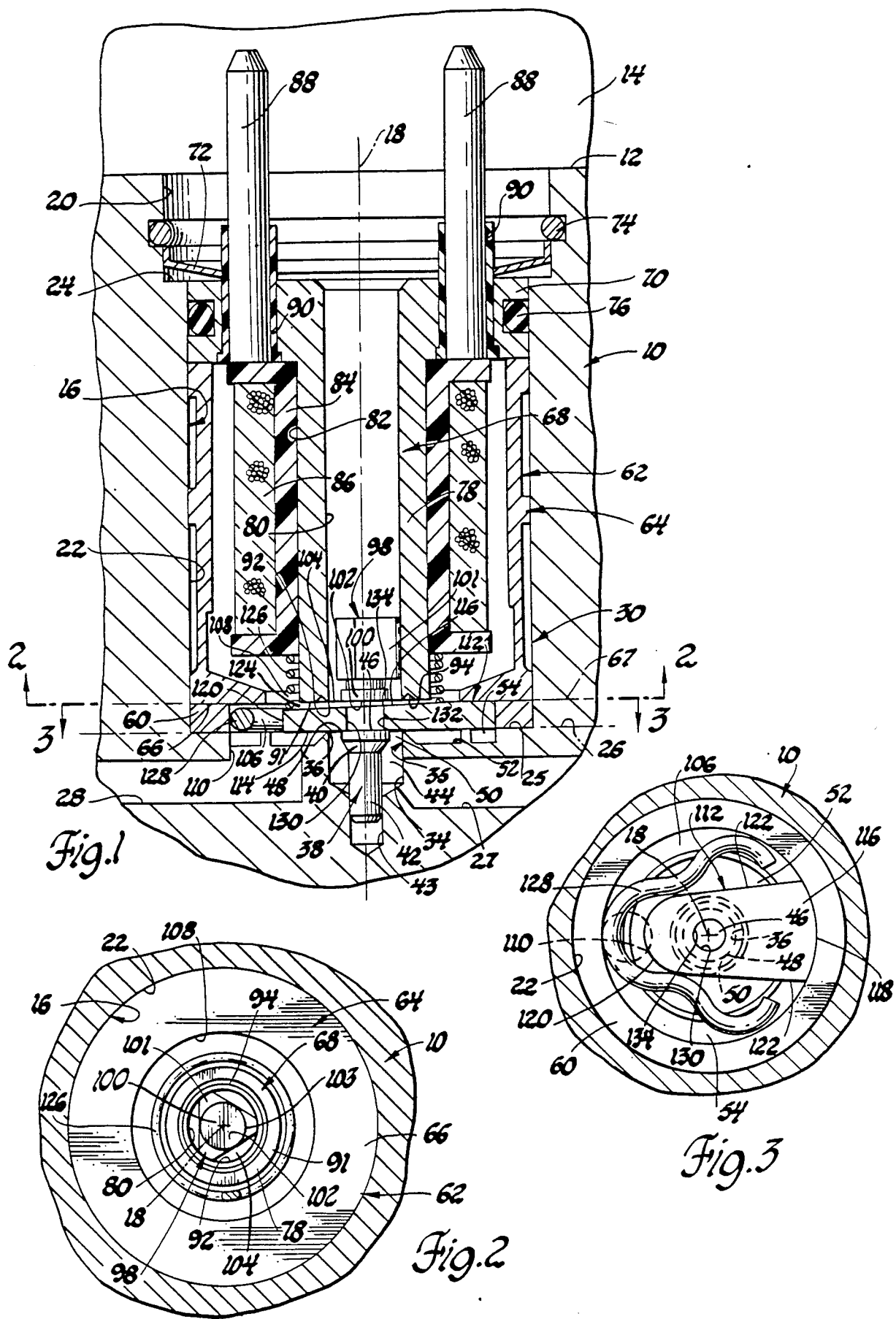
FIG. 1 is a fragmentary, longitudinal sectional view of an electro-hydraulic pressure regulating valve according to this invention.
FIG. 2 is a view taken generally along the plane indicated by lines 2—2 in FIG. 1.
FIG. 3 is a sectional view taken generally along the plane indicated by lines 3—3 in FIG. 1.

Referring to FIG. 1 of the drawings, a support structure 10 has a side wall 12 exposed to a fluid reservoir or sump 14 maintained at substantially atmospheric pressure. The support structure has a stepped bore 16 therein aligned on a main axis 18 generally perpendicular to the side wall 12. The stepped bore includes a large diameter inner wall 20 and a small diameter inner wall 22 connected to the wall 20 by a shoulder 24 and terminates at a flat bottom wall 25 in a plane 26 perpendicular to the axis 18. A supply passage 27 in the support structure 10 is connected to a source, not shown, of hydraulic fluid at a high supply pressure. A control pressure passage 28 in the support structure 10 is connected to a fluid circuit or to a pressure actuated device, not shown, which requires a supply of hydraulic fluid at a control pressure. The support structure 10 defines a housing for an electro-hydraulic pressure regulating valve 30 according to this invention which is disposed in stepped bore 16 and operates to regulate the magnitude of the control pressure in control pressure passage 28.

A large diameter portion 34 of another stepped bore 35 in the bottom wall 25 aligned on the main axis 18 intersects the bottom wall at a circular edge 36 and also intersects the supply passage 27 whereby fluid at supply pressure is delivered to the bore 35. A first seat insert 38 includes a head portion 40 and a body portion 42. The body portion is pressed into a small diameter portion 43 of the bore 35 whereby the first seat insert is rigidly connected to the support structure. The first seat insert 38 cooperates with the large diameter portion 34 of the bore 35 in defining a generally annular supply pressure chamber 44. The head portion 40 of the first seat insert has a flat end surface 46 disposed in the plane 26 and bounded by a circular edge 48 concentric with circular edge 36 of the large diameter portion 34 of bore 35. The circular edges 36 and 48 cooperate in defining therebetween, in the radial direction relative to axis 18, an annular supply pressure port 50. The radial seat area of port 50 equals $\pi/4\ (D_1^2 - D_2^2)$ whereby $D_1$ is the diameter of circular edge 36 and $D_2$ is the diameter of circular edge 48.

A pair of concentric circular relief grooves 52 and 54 in the bottom wall 25 surround the supply pressure port 50. The radially inner edge of the relief groove 52 is inwardly chamfered and intersects the plane 26 substantially at the circular edge 36 so that a knife edge type land is defined in the plane 26 around the supply pressure port 50.

A spacer ring 60 is seated on the bottom wall 25 of the bore 16 and extends generally from the small diameter inner wall 22 thereof to the radially outermost extremity of the circular relief groove 54. A solenoid 62 of the pressure regulating valve 30 is disposed above the spacer ring 60 and includes a cup-shaped outer pole piece 64 closely received in the small diameter wall 22 of the bore 16 with an annular working surface 66 thereof seated against the spacer ring 60. The annular working surface 66 is disposed in a plane 67 parallel to the plane 26. An inner pole piece 68 of the solenoid 62 has a disc-like flange portion 70 closely received in the small diameter wall 22 of the bore 16 and bearing against the end of the outer pole piece 64. A dished, annular washer 72 is closely received in the large diameter wall 20 of the bore 16 with an inner lip bearing against the flange portion 70 of the inner pole piece 68 and an outer lip bearing against a split retaining ring 74 seated in an appropriate groove in the wall 20. A resilient seal ring 76 seated in an appropriate groove in the flange portion 70 of the inner pole piece defines a fluid seal between the small diameter wall 22 of the bore 16 and the solenoid 62.

The inner pole piece 68 further includes a cylindrical tubular stem portion 78 integral with the flange portion 70 and aligned on the main axis 18. The stem portion has an internal cylindrical bore 80 extending therethrough and an outer cylindrical wall 82. An insulating bobbin 84 of the solenoid is received on the outer cylindrical wall 82 of the stem portion and abuts the flange portion 70 of the inner pole piece. A coil 86 of the solenoid is wound in conventional fashion on the bobbin 84, the coil being energized through a pair of pin terminals 88 mounted on the flange portion 70 and insulated therefrom by corresponding ones of a pair of bushings 90.

The stem portion 78 of the inner pole piece 68 has a distal end 91 disposed in the plane 67. The internal cylindrical bore 80 in the stem portion intersects the distal end 91 at a circular edge 92. An annular groove 94 is formed in the distal end 91 of the stem portion. The radially inner edge of the relief groove 94 is inwardly chamfered and intersects the plane 67 substantially at the circular edge 92 so that a knife edge type land is defined in the plane 67 around the cylindrical bore 80 opposite the land defined at the circular edge 36 around the supply pressure port 50. A second seat insert 98 is pressed into the bore 80 in the stem portion and includes a circular head portion 100 and a triangular body portion 101 separated from the head portion by a groove. An imaginary circumscribing circle around the triangular body portion 101 has a diameter exceeding the diameter of the bore 80 so that an intereference fit is defined between the body portion 101 and the stem portion 78 whereby the second seat insert 98 is attached to the stem portion. The head portion 100 has a flat end surface 102 in the plane 67 bounded by a circular edge 103 concentric with the circular edge 92 around the bore 80. The circular edges 92 and 103 cooperate in defining therebetween, in the radial direction relative to the axis 18, an annular exhaust port 104 opposite the supply pressure port 50. The seat area of the exhaust port 104 equals $\pi/4$ $(D_3^2 - D_4^2)$, where $D_3$ is the diameter of circular edge 92 and $D_4$ is the diameter of circular edge 103.

The volume between the planes 26 and 67 within the spacer ring 60 defines a control pressure chamber 106 communicating with supply pressure chamber 44 through the supply pressure port 50 and with the sump 14 through the exhaust port 104 and the internal bore 80 of the stem portion 78. The control pressure chamber 106 communicates with the interior of the outer pole piece 64 through an annulus 108 defined in the center of the working surface 66 of the outer pole piece 64 between the latter and the stem portion 78. Resilient ring 76 prevents fluid leakage from within the solenoid. The control pressure chamber 106 communicates with the control pressure passage 28 through a control pressure port 110 in the bottom wall 25 of the bore 16, FIGS. 1 and 3.

A valve member in the form of a magnetically permeable armature plate 112 is disposed in the control pressure chamber 106 and operates to open and close the supply pressure port 50 and the exhaust port 104. Except as described hereinafter, the armature plate 112, its mounting in the control pressure chamber 106, and its movements are substantially as described in the aforementioned U.S. Pat. No. 4,572,436 to Stoltman et al. Briefly, when viewed from the side, FIG. 1, the armature plate 112 is tapered or wedge-shaped and includes a flat supply port seating surface 114 and a flat exhaust port seating surface 116. When viewed in plan, FIG. 3, the armature plate 112 has a large radius curved end 118 bearing against the inside of the spacer ring 60 and a small radius curved end 120 interconnected by diverging side walls 122. The radius of the small radius curved end 120 and the spacing between the diverging side walls 122 adjacent the small radius curved end are coordinated to ensure that the armature plate completely overlaps the circular lands 58 and 96 around the supply pressure port 50 and the exhaust port 104, respectively.

The armature plate 112 is pivotable generally about a fulcrum at the large radius curved end 118 between a supply seated position, FIG. 1, and an exhaust seated position, not shown. In the supply seated position, the supply port seating surface 114 is disposed in the plane 26 and seats on both the circular land around the supply pressure port 50 and on the flat end surface 46 of the first seat insert 38 while the exhaust port seating surface 116 is displaced by a maximum air gap 124 from the plane 67. In the exhaust seated position, the exhaust port seating surface 116 is disposed in the plane 67 and seats on the circular land around the exhaust port 104 and on the flat end surface 102 of the second seat insert 98 while the supply port seating surface 114 is separated from the plane 26 by the amount of the valve lift which is substantially equal to the air gap 124. The lift of the armature plate defines the valve seat area in the axial direction relative to the axis 18 in the supply seated and the exhaust seated positions of the plate. A coil spring 126 around the stem portion 78 of the inner pole piece bears at one end against the exhaust port seating surface 116 of the armature plate 112 and at the other end against the bobbin 84 and biases the plate to the supply seated position. A wire retainer 128, formed of nonmagnetic material, is disposed in the control pressure chamber 106 for the purpose of maintaining the armature plate 112 substantially in a centered position, FIG. 3, relative to the supply pressure and the exhaust ports 50 and 104, respectively.

As seen best in FIGS. 1 and 3, the armature plate 112 differs from the armature plate described in aforementioned U.S. Pat. No. 4,572,436 in that it includes a circular aperture or cut-out 130 which intersects the supply port seating surface 114 at a circular edge 132 and the exhaust port seating surface 116 at a circular edge 134.

In the supply seated position, the circular edge 132 is concentric with and disposed slightly inboard of the circular edge 48 around the flat end surface 46 of the first seat insert so that the armature plate completely overlaps and closes the annular supply pressure port 50. In the exhaust seated position, the circular edge 134 is concentric with and slightly inboard of the circular edge 103 around the flat end surface 102 of the second seat insert 98 so that the armature plate completely overlaps and closes the annular exhaust port 104.

Commencing with the solenoid deenergized and the supply pressure chamber 44 charged with fluid at the supply pressure, the electro-hydraulic pressure regulating valve 30 operates as follows. The spring 126 holds the armature plate 112 in the supply seated position and the control pressure chamber 106 is exhausted to the sump 14 through the exhaust port 104 so that control pressure equals atmospheric pressure. The differential pressure area of the armature plate 112 which is exposed to control pressure is equal to only the radial seat area of the supply pressure port 50 so that the spring 126 must, at a minimum, exert a force which just exceeds the product of the radial seat area of the supply pressure port multiplied by the supply pressure. To maximize the flow rate from the supply pressure chamber 44 into the control pressure chamber 106 with the valve lift equal to air gap 124, the diameter $D_1$ is maximized. To minimize the radial seat area of the supply pressure port, and thus the differential pressure resultant force on the armature plate which must be resisted by the spring and overcome by the solenoid EMF in moving the armature plate from the supply seated position to the exhaust seated position, the diameter $D_2$ is maximized to a dimension commensurate with the required flow rate through radial and axial valve seat areas. If the diameter $D_2$ is smaller than this maximum, then the supply port is oversized and a larger spring is required to resist the correspondingly larger differential pressure resultant force on the armature plate.

When the coil 86 is energized, the armature plate 112 is pivoted against the spring 126 by the solenoid EMF from the supply seated position to the exhaust seated position. With the exhaust port 104 closed, control pressure in the control pressure chamber 106 increases toward supply pressure. Fluid in the control pressure chamber circulates all around the armature plate 112 except for the differential area of the armature plate across which the control pressure acts to produce a differential pressure resultant force in the direction toward the exhaust seated position. If the coil is energized for a sustained period, control pressure will eventually become equal to supply pressure. If the coil is alternately energized and deenergized at selected frequencies corresponding to selected duty cycles of the solenoid, then the control pressure will stabilize at an intermediate magnitude between supply pressure and atmospheric pressure. The relief grooves 52 and 54 in the bottom wall 25 of the bore 16 and the groove 94 in the distal end of the stem portion reduce the tendency for fluid to become trapped between the armature plate and the bottom wall and the stem portion thereby to avoid viscous damping of the armature plate.

It is desirable to minimize the magnitude of the differential pressure resultant force on the armature plate 112 in the direction toward the exhaust seated position because the spring 126 must overcome this force in repositioning the armature plate in the supply seated position. If that resultant force exceeds the minimum achievable, then a heavier spring 126 is required to produce the larger repositioning force and, hence, increased solenoid EMF is required to pivot the armature plate in the opposite direction to the exhaust seated position. The aperture 130 in the armature plate 112 contributes to minimization of the differential pressure resultant force toward the exhaust seated position by removing that portion of the armature plate which would otherwise be juxtaposed the end surface 102 of the second seat insert 98 in the exhaust seated position of the armature plate. Thus, differential pressure area of the armature plate in the exhaust seated position is substantially equal to only the seat area of the exhaust port 104.

The embodiments of the invention in which an exclusive property or privilege is claimed are defined as follows:

1. An electro-hydraulic pressure regulating valve comprising:

means defining a valve housing having a main axis, means defining a control pressure chamber in said valve housing connected to a control pressure port, means defining an annular supply pressure port in said housing between a source of fluid at a supply pressure and said control pressure chamber aligned on said main axis in a first plane perpendicular to said main axis and having a first predetermined seat area in said first plane through which pressurized fluid is delivered to said control pressure chamber, means defining an annular exhaust port between a low pressure fluid sump and said control pressure chamber aligned on said main axis in a second plane parallel to said first plane and having a second predetermined seat area in said second plane through which fluid is exhausted from said control pressure chamber, a magnetically permeable armature plate having a flat supply sealing surface and a flat exhaust sealing surface, means mounting said armature plate in said control pressure chamber for movement between a supply seated position wherein said supply sealing surface closes said supply pressure port and said exhaust sealing surface opens said exhaust port and an exhaust seated position wherein said exhaust sealing surface closes said exhaust port and said supply sealing surface opens said supply pressure port, the differential area of said armature plate exposed to said supply pressure in said supply seated position of said armature plate being equal to substantially only said first predetermined seat area, spring means between said valve housing and said armature plate biasing said armature plate to said supply seated position, electric solenoid means in said valve housing operative when selectively energized to create a solenoid EMF for moving said armature plate from said supply seated position to said exhaust seated position, and means defining a circular cut-out in said armature plate juxtaposed a portion of said valve housing radially inboard of said annular exhaust port in said exhaust seated position of said armature plate operative to limit the differential area of said armature plate exposed to said control pressure in said exhaust seated position of said armature plate to substantially only said second predetermined seat area thereby to minimize the pressure differential resultant force acting on said armature plate toward said exhaust seated position.

2. An electro-hydraulic pressure regulating valve comprising:

a support structure adjacent a fluid sump and defining a valve housing having a main axis, a first cylindrical bore in said support structure aligned on said main axis and terminating at a bottom wall disposed in a first plane perpendicular to said main axis, a second cylindrical bore in said support structure aligned on said main axis and intersecting said bottom wall at a first circular edge having a first diameter, means connecting said second bore to a source of fluid at a supply pressure, a first seat insert on said support structure disposed in said second bore and including a flat end surface in said first plane bounded by a second circular edge having a second diameter concentric with said first circular edge and cooperating therewith in defining an annular supply pressure port having a first predetermined seat area in said first plane, an annular spacer ring in said first bore abutting said bottom wall, a cup-shaped solenoid outer pole piece in said first bore having an annular working surface abutting said spacer ring and disposed in a second plane perpendicular to said main axis, a control pressure chamber being defined within said spacer ring between said first and said second planes, a control pressure port in said bottom wall connected to said control pressure chamber, a solenoid inner pole piece abutting said solenoid outer pole piece and including a tubular stem portion aligned on said main axis having an internal bore therethrough communicating between said control pressure chamber and said fluid sump, said stem portion terminating at a distal end in said second plane and said internal bore intersecting said distal end at a third circular edge having a third diameter equal to said first diameter, a second seat insert having a flat end surface bounded by a fourth circular edge having a fourth diameter equal to said second diameter, means mounting said second seat insert on said stem portion within said internal bore with said end surface in said second plane and with said fourth circular edge concentric with said third circular edge and cooperating therewith in defining an annular exhaust port between said fluid sump and said control pressure chamber having a second predetermined seat area in said second plane equal to said first predetermined seat area, a magnetically permeable armature plate having a flat supply sealing surface and a flat exhaust sealing surface, means mounting said armature plate in said control pressure chamber for pivotal movement between a supply seated position wherein said supply sealing surface closes said supply pressure port and said exhaust port is open and an exhaust seated position wherein said exhaust sealing surface closes said exhaust port and said supply pressure port is open, the differential area of said armature plate exposed to said supply pressure in said supply seated position of said armature plate being equal to substantially only said first predetermined seat area, a spring disposed between said solenoid inner pole piece and said armature plate biasing said armature plate to said supply seated position, a solenoid coil on said solenoid inner pole piece operative when selectively energized to create a solenoid EMF for moving said armature plate from said supply seated position to said exhaust seated position, and means defining a cut-out in said armature plate intersecting each of said supply sealing and said exhaust sealing surfaces at circular edges aligned on said main axis and having diameters substantially equal to said second and said fourth diameters so that in said exhaust seated position of said armature plate the differential pressure area of said armature plate exposed to said control pressure is equal to substantially only said second predetermined seat area.

* * * * *